(12) United States Patent
Haas et al.

(10) Patent No.: US 6,227,057 B1
(45) Date of Patent: May 8, 2001

(54) APPARATUS AND METHOD FOR RAPID STRAIN MEASUREMENT

(75) Inventors: Edwin G. Haas, Sayville; Robert C. Schwarz, Huntington; Robert Winter, Dix Hills; John M. Papazian, Great Neck, all of NY (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,847

(22) Filed: May 18, 1998

(51) Int. Cl.[7] ..................................................... G01B 7/16
(52) U.S. Cl. ............................................................. 73/775
(58) Field of Search .............................. 73/762, 763, 775, 73/776

(56) References Cited

U.S. PATENT DOCUMENTS

| | | |
|---|---|---|
| 2,350,073 | 5/1944 | Simmons, Jr. .......................... 201/63 |
| 3,428,933 | 2/1969 | Gerstenberger .......................... 338/2 |
| 3,599,139 | 8/1971 | Low .......................................... 338/2 |
| 3,745,502 | 7/1973 | Watanabe et al. ....................... 338/3 |
| 3,782,182 | 1/1974 | Starr ...................................... 73/88.5 |
| 3,848,462 | 11/1974 | McIlrath ............................... 73/88.5 |
| 3,986,254 | 10/1976 | Nordstrom ............................. 29/613 |
| 4,050,976 | 9/1977 | Reiters ................................. 156/233 |
| 4,767,484 | 8/1988 | Schott et al. ......................... 156/233 |
| 4,771,638 | * 9/1988 | Sugiyama et al. ..................... 73/721 |
| 4,777,826 | * 10/1988 | Rud Jr., et al. ....................... 73/708 |
| 5,289,722 | 3/1994 | Walker et al. ......................... 73/755 |

* cited by examiner

Primary Examiner—Max Noori
(74) Attorney, Agent, or Firm—Terry J. Anderson; Karl J. Hoch, Jr.

(57) ABSTRACT

A strain gage assembly 10 includes a mounting substrate 12 having an adhesive surface 14 and a gage surface 16. The adhesive surface 14 of the mounting substrate 12 includes an adhesive layer 18 disposed thereon operable to affix the mounting substrate 12 to a component. The adhesive layer 18 is further operable to allow ready detachment of the mounting substrate 12 from the component. The gage surface 16 of the mounting substrate 12 includes a strain gage 20 disposed thereon. The mounting substrate 12 may be formed from a material operable to reduce a strain level received by the strain gage 20.

23 Claims, 2 Drawing Sheets

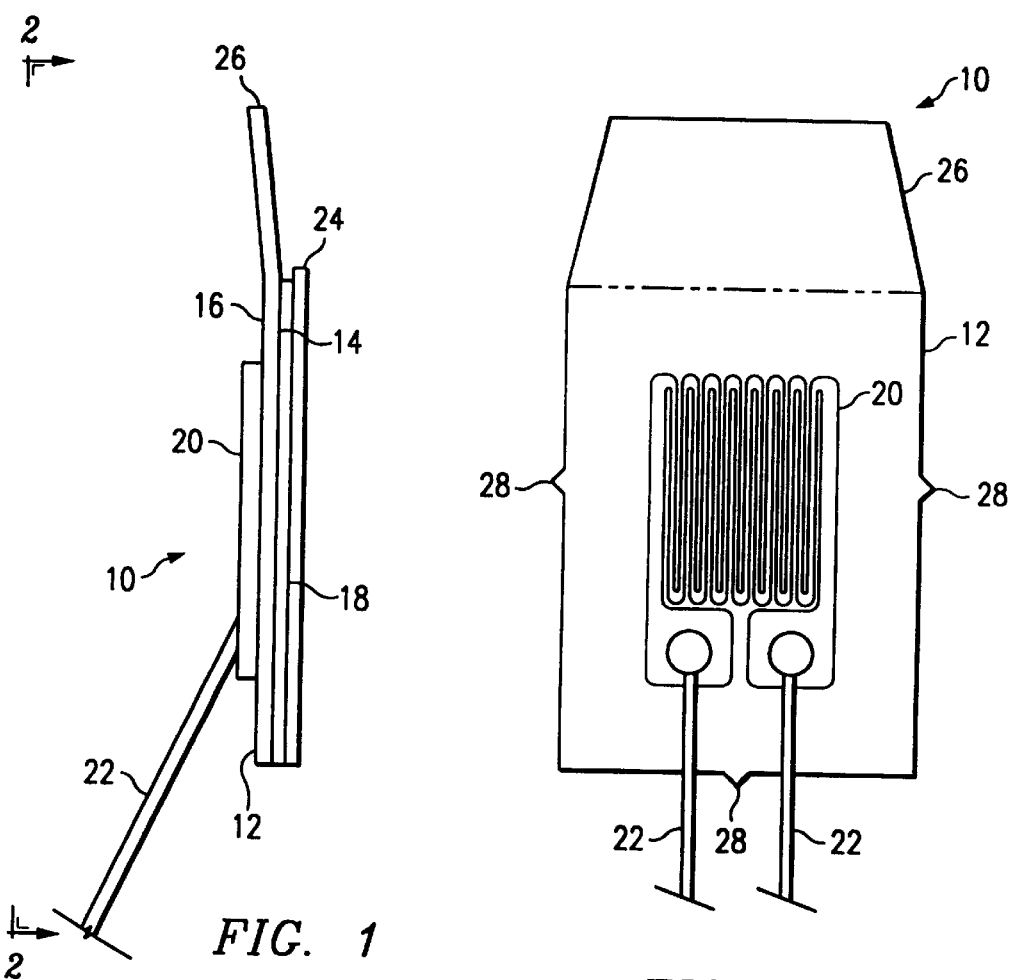
FIG. 1
FIG. 2
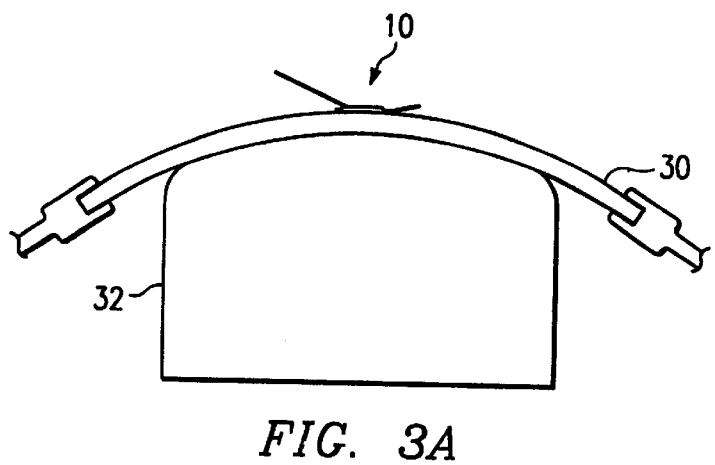
FIG. 3A

APPARATUS AND METHOD FOR RAPID STRAIN MEASUREMENT

TECHNICAL FIELD OF INVENTION

This invention relates in general to the field of strain gages and, more particularly, to an apparatus and method for rapid strain measurement.

BACKGROUND OF THE INVENTION

A strain gage is a device used to measure surface strains in structural materials. A type of strain gage most commonly used is an electrical resistance-type strain gage. An electrical resistance-type strain gage includes a metallic foil grid having a number of elongated, laterally-spaced, series-connected grid elements and enlarged terminal regions. The enlarged terminal regions may be attached to external electrical leads. In operation, as a structural material deforms, the foil grid elements change in length. This change in length results in a change in electrical resistance of the grid elements. The change in electrical resistance of the grid elements may be measured to provide a level of strain experienced by the structural material.

Using the strain gage to measure an amount of surface strain in a structural component usually requires securely affixing or bonding the strain gage to the structural component. The process of bonding the strain gage to the structural component usually requires chemically and mechanically preparing a location on the structural component to receive the strain gage, applying a masking material to the structural component to prevent subsequent process materials from migrating onto adjacent areas of the structural component, and bonding the strain gage to the structural component using cements and/or epoxies. Bonding materials may require mixing precise amounts of several different chemicals together and may require elevated temperatures and pressures while curing. After the bonding material has cured and an amount of strain has been measured, the strain gage may be either removed from the structural component, allowed to remain on the structural component, or the structural component may be discarded. If the strain gage is removed from the structural component, residual bonding material may also have to be removed from the structural component.

The above-described process of using a strain gage suffers several disadvantages. For example, the above-described process of applying the strain gage is complex and time-consuming. In addition, removing the strain gage from the structural component may damage the structural component and render the strain gage unusable for repeated use. Also, discarding the structural component or allowing the strain gage to remain on the structural component may be unacceptable alternatives.

SUMMARY OF THE INVENTION

Accordingly, a need has arisen for an apparatus and method for providing rapid strain measurement of structural components.

In accordance with the teachings of the present invention, an apparatus and method for rapid strain gage measurement are provided that address disadvantages and problems associated with prior art strain gages and methods. According to one embodiment of the present invention, a strain gage assembly comprises a mounting substrate having an adhesive surface and a gage surface. The adhesive surface includes an adhesive layer disposed thereon operable to affix the mounting substrate to a component, the adhesive layer further operable to allow ready detachment of the mounting substrate from the component. The mounting substrate also includes a strain gage affixed to the gage surface of the mounting substrate.

According to another embodiment of the invention, a method for fabricating a strain gage assembly comprises providing a mounting substrate having an adhesive surface and a gage surface. The adhesive surface has an adhesive layer disposed thereon operable to affix the substrate to a component, the adhesive layer further operable to allow ready detachment of the mounting substrate from the component. The method also includes affixing a strain gage to the gage surface of the mounting substrate.

Embodiments of the invention provide several technical advantages. For example, one embodiment of the invention provides a strain gage assembly that requires less time and cost to install and remove than conventional strain gage assemblies. Also, an embodiment of the invention provides a strain gage assembly that is reusable. Another embodiment of the invention provides a strain gage assembly that attenuates strain, allowing measurement of large cyclic strains. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 1 illustrates an enlarged profile view of a strain gage assembly incorporating the teachings of the present invention;

FIG. 2 illustrates an enlarged plan view of the strain gage of FIG. 1 taken along the line 2—2;

FIG. 3A illustrates a profile view of a strain gage assembly incorporating the teachings of the present invention being used in a sheet metal stretch forming process;

DETAILED DESCRIPTION OF THE INVENTION

Figure 3B:
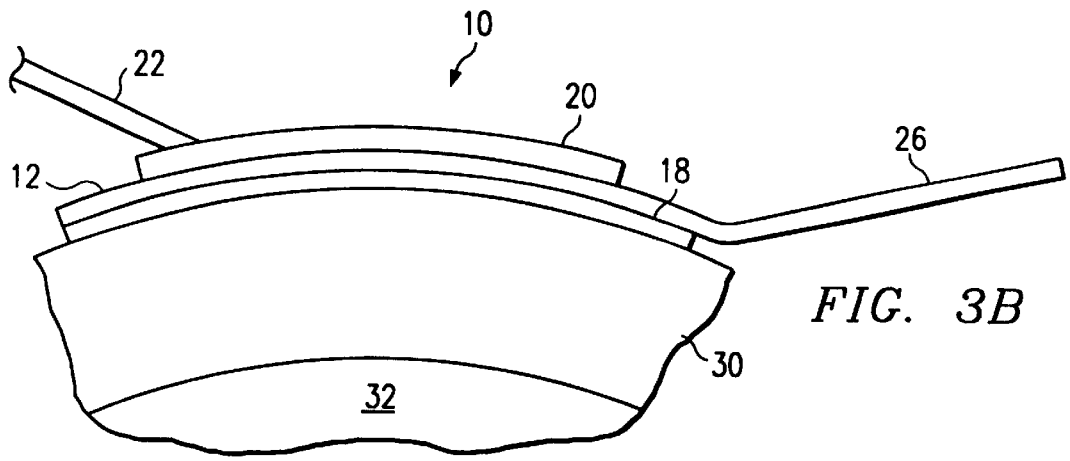
FIG. 3B illustrates an enlarged profile view of the strain gage assembly of FIG. 3A.

Embodiments of the present invention and its advantages are best understood by referring to FIGS. 1 through 3 of the drawings, like numbers being used for like and corresponding parts of the various drawings.

FIG. 1 illustrates an enlarged profile view of a strain gage assembly 10 incorporating the teachings of the present invention, and FIG. 2 illustrates a plan view of strain gage assembly 10 shown in FIG. 1 taken along the line 2—2. Strain gage assembly 10 includes, as best shown in FIG. 1, a mounting substrate 12 having an adhesive surface 14 and a gage surface 16. Adhesive surface 14 of mounting substrate 12 has an adhesive layer 18 disposed thereon. Gage surface 16 of mounting substrate 12 has a strain gage 20 disposed thereon. Strain gage 20 may be an electrical resistance-type strain gage having a pair 22 of external leads attached thereto, as shown in FIGS. 1 and 2, or may be other types of strain gages. Strain gage assembly 10 may also include a removable cover 24 disposed over adhesive layer 18 to protect adhesive layer 18 from contamination prior to any use of strain gage assembly 10. In one embodiment of the invention, removable cover 24 extends beyond adhesive layer 18 to facilitate removal of removable cover 24.

Mounting substrate 12 of strain gage assembly 10 may also include a tab or gripping portion 26. Gripping portion 26 of mounting substrate 12 may be created by omitting adhesive layer 18 from a portion of adhesive surface 14 of mounting substrate 12. Gripping portion 26 of mounting substrate 12 may be formed at an angle with respect to an adjacent area of mounting substrate 12, as shown in FIG. 1, or may have other suitable shapes and orientations. For example, in one embodiment of the invention, mounting substrate 12 may be constructed having a thickness of 0.001 inches and may include a groove or crease (not explicitly shown) on gage surface 16 thereby allowing gripping portion 26 to be physically manipulated to form an angle with respect to an adjacent area of mounting substrate 12.

Mounting substrate 12 may also include protrusions 28 offset 90° apart along edges of mounting substrate 12, as shown in FIG. 1, for aligning strain gage assembly 10; however, mounting substrate 12 may incorporate other elements or aids for aligning strain gage assembly 10, such as longitudinally and transversely disposed markings (not explicitly shown). As described in greater detail in conjunction with FIG. 3, strain gage assembly 10 provides for efficient application and removal of a strain gage for measuring strains in structural components without the increased risk of damaging the structural component by removing the strain gage.

FIG. 3A is a profile view showing the use of strain gage assembly 10 during formation of a sheet 30 of sheet metal, and FIG. 3B is an enlarged view of strain gage assembly 10 shown in FIG. 3A. During formation of sheet 30, forces are applied to sheet 30 creating surface strain, which is an example of a strain that may be measured by strain gage assembly 10. As illustrated in FIG. 3B, removable cover 24 has been removed from strain gage assembly 10 and strain gage assembly 10 has been affixed to sheet 30 using adhesive layer 18. Sheet 30 is shown being stretch formed on a form die 32.

In one embodiment of the invention, mounting substrate 12 may be constructed from an elastic tear-resistant material. Constructing mounting substrate 12 from an elastic material allows mounting substrate 12 to easily deform with the deformation of sheet 30, such as during a forming process. Constructing mounting substrate 12 from a tear-resistant material allows mounting substrate 12 to easily transfer an amount of surface strain in sheet 30 to strain gage 20. Also, mounting substrate 12 may be constructed from a transparent or translucent material to aid in properly locating strain gage assembly 10 on sheet 30, or may be constructed from opaque materials.

In one embodiment of the invention, adhesive layer 18 may be constructed from materials having a low peel strength and a high shear strength. A low peel strength material property of adhesive layer 18 allows strain gage assembly 10 to be easily removed or peeled off from sheet 30 using gripping portion 26. Also, a low peel strength material property of adhesive layer 18 combined with an elastic material property of mounting substrate 12 provides a flexible strain gage assembly 10 for easy removal from sheet 30. A high shear strength material property of adhesive layer 18 allows surface strains experienced by sheet 30 to be transferred to mounting substrate 12 and strain gage 20. In one embodiment of the invention, a combination of mounting substrate 12 and adhesive layer 18 may be constructed from an acrylic adhesive tape, such as an acrylic adhesive tape manufactured by Can-Do under part number 454-AC; however, other suitable materials may be used.

The advantages of the present invention include the ability to cost-efficiently incorporate the use of strain gages in a variety of applications, such as the production of highly contoured sheet metal components. For example, as shown in FIG. 3B, as sheet 30 is stretch formed over form die 32, elastic mounting substrate 12 allows strain gage assembly 10 to easily deform with sheet 30. However, a high shear strength adhesive layer 18 and elastic mounting substrate 12 allow a surface strain experienced by sheet 30 during the stretch forming process to be transferred through adhesive layer 18 and mounting substrate 12 to strain gage 20.

Figure 4:
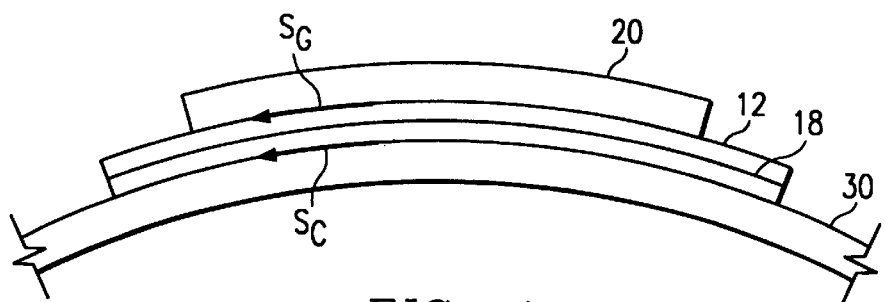
FIG. 4 illustrates an amount of surface strain experienced by a structural component, represented by $S_c$, and an amount of strain measured by a strain gage incorporating the teachings of the present invention, represented by $S_G$.

FIG. 4 illustrates a comparison of an amount of surface strain experienced by sheet 30 during a forming process, represented by $S_c$, and an amount of strain measured by strain gage 20, represented by $S_G$. As shown by the following equation, adhesive layer 18 and mounting substrate 12 may be selected so that a level of strain measured by strain gage 20 corresponds exactly to or is proportional to a level of surface strain experienced by sheet 30:

$$\alpha S_G = S_c \quad (1)$$

where $\alpha$ equals a numerical value. For example, a low peel strength adhesive layer 18 that allows easy removal of strain gage assembly 10 may also allow a level of strain measured by strain gage 20 to be less than a level of strain experienced by sheet 30, thereby causing the value of $S_G$ to be less than the value of $S_c$. Thus, an amount of strain measured by strain gage 20 may not correspond exactly to an amount of surface strain actually experienced by sheet 30. Although the value of a may be determined for sheet 30 for each forming process, determining the value of a is not as important as determining $S_G$ for a desired contour of sheet 30. For example, strain gage assembly 10 may be affixed to sheet 30 and the value of $S_G$ measured while sheet 30 is formed to a desired contour. Once a desired contour of sheet 30 has been obtained, $S_G$ is known for adhesive layer 18 and mounting substrate 12 associated with a desired contour of sheet 30. Thus, a precise forming operation may be repeated on a new sheet 30 using strain gage assembly 10 by forming sheet 30 until approximately the same value of $S_G$ is achieved. Once the forming operation is complete, strain gage assembly 10 may be easily removed from sheet 30 and either reused or discarded. Thus, the present invention provides a cost-efficient method of incorporating the use of strain gages in a variety of applications not provided by conventional strain gage assemblies.

In addition, the advantages of the present invention include reducing the risk of damaging sheet 30 that may result from removing a conventional strain gage assembly. The low peel strength material properties of adhesive layer 18 combined with the elastic and tear-resistant material properties of mounting substrate 12 allow strain gage assembly 10 to be easily removed from sheet 30. For example, an operator may simply remove or peel strain gage assembly 10 from sheet 30 using gripping portion 26. Thus, strain gage assembly 10 does not have to remain permanently bonded to sheet 30, which may inhibit the functionality or appearance of sheet 30. Also, strain gage assembly 10 reduces the risk of damaging sheet 30 that may result from removing conventional strain gage assemblies.

Further, strain gage assembly 10 reduces the risk of overworking or underworking sheet 30 during a forming process. For example, in a stretch forming process, sheet 30 will plastically form to form die 32 at different rates depending on the desired contours of sheet 30. By placing strain gage assembly 10 at various predetermined locations on sheet 30, the stretch forming process can be monitored. As discussed previously, adhesive layer 18 and mounting substrate 12 may be selected to provide a predetermined level of strain transfer to strain gage 20 for a particular contour area of sheet 30. Once the predetermined level of strain has been reached in a particular area of sheet 30, the forming process for that particular area of sheet 30 may be discontinued. Thus, if other areas of sheet 30 require additional forming, adjustments may be made so that the particular area of sheet 30 that has reached the predetermined level of strain for a desired contour is not overworked.

Figure 5:
FIG. 5 illustrates an alternate embodiment of the present invention incorporating strain attenuation.

FIG. 5 illustrates an alternate embodiment of the present invention where mounting substrate 12 of strain gage assembly 10 produces strain attenuation. Strain attenuation refers to a reduction in a value of strain measured by a strain gage compared to a level of surface strain experienced by a structural component. For example, as shown in FIG. 5, mounting substrate 12 may be constructed so that a predetermined level of strain distribution occurs in mounting substrate 12 prior to reaching strain gage 20. This predetermined level of strain distribution may be obtained by utilizing a material to form mounting substrate 12 having a desired material property to produce the predetermined level of strain distribution, by varying the thickness of mounting substrate 12, or by other suitable methods for reducing a value of strain.

The advantages of this alternate embodiment of the present invention include reducing the risk of permanently deforming strain gage 20 in applications involving high levels of surface strain or cyclical surface strains. For example, strain gage 20 may be constructed from a material having a defined yield point and a defined elastic limit. The yield point of a material is defined as the level of stress at which a material continues to deform without further increases in stress. The elastic limit of a material is defined as the value of stress beyond which the material experiences a permanent deformation after the stress is removed. As forces are applied to sheet 30, the level of strain experienced by sheet 30 may exceed the yield point or the elastic limit of strain gage 20. Beyond the yield point, strain gage 20 becomes plastically deformed and no longer provides accurate strain measurements. Beyond the elastic limit, strain gage 20 becomes permanently deformed and no longer provides accurate cyclical strain measurements. By attenuating the level of surface strain received by strain gage 20, strain gage assembly 10 may be used in high level surface strain and cyclical surface strain applications. Thus, strain gage assembly 10 provides greater flexibility than conventional surface strain assemblies.

Although the present invention and its advantages have been described in detail, it should be understood that various changes, substitutions, and alterations can be made therein without departing from the spirit and scope of the present invention as defined by the appended claims.

What is claimed is:

1. A strain gage assembly for rapid strain measurement of a component, the strain gage assembly comprising:
    a mounting substrate having an adhesive surface on a first side of the mounting substrate and a gage surface on a second side of the mounting substrate, the adhesive surface having an adhesive layer disposed thereon operable to affix the mounting substrate to the component during strain measurement collection, the adhesive layer further operable to allow ready detachment of the mounting substrate from the component; and
    a strain gage affixed to the gage surface of the mounting substrate.

2. The strain gage assembly of claim 1, and further comprising a removable cover disposed over the adhesive layer.

3. The strain gage assembly of claim 1, wherein the adhesive surface further comprises a gripping portion being devoid of the adhesive layer.

4. The strain gage assembly of claim 1, wherein the mounting substrate further comprises an alignment element operable to properly position the strain gage assembly on the component.

5. The strain gage assembly of claim 4, wherein the alignment element comprises a plurality of longitudinally and transversely disposed markings.

6. The strain gage assembly of claim 1, wherein the mounting substrate is formed from a substantially transparent material.

7. The strain gage assembly of claim 1, wherein the mounting substrate is formed from a substantially translucent material.

8. The strain gage assembly of claim 1, wherein the mounting substrate is formed from a material operable to reduce a strain level received by the strain gage.

9. The strain gage assembly of claim 1, wherein the adhesive layer is further operable to affix the mounting substrate to another component after detachment of the mounting substrate.

10. A method of manufacturing a strain gage assembly for rapid strain measurement of a component, the method of manufacturing the strain gage assembly comprising:
    providing a mounting substrate having an adhesive surface on a first side of the mounting substrate and a gage surface on a second side of the mounting substrate, the adhesive surface having an adhesive layer disposed thereon operable to affix the mounting substrate to the component during strain measurement collection, the adhesive layer further operable to allow ready detachment of the mounting substrate from the component; and
    affixing a strain gage to the gage surface of the mounting substrate.

11. The method of claim 10, and further comprising disposing a removable cover over the adhesive layer.

12. The method of claim 10, wherein the step of providing a mounting substrate having an adhesive surface further comprises providing an adhesive surface having a gripping portion being devoid of the adhesive layer.

13. The method of claim 10, wherein the step of providing a mounting substrate further comprises providing an alignment element disposed on the mounting substrate operable to properly position the strain gage assembly on the component.

14. The method of claim 10, wherein the step of providing a mounting substrate further comprises providing a mounting substrate being formed from a substantially transparent material.

15. The method of claim 10, wherein the step of providing a mounting substrate further comprises providing a mounting substrate operable to reduce a strain level received by the strain gage.

16. A method for rapid strain measurement of a component, the method comprising:

providing a strain gage assembly fabricated by a method comprising:

providing a mounting substrate having an adhesive surface on a first side of the mounting substrate and a gage surface on a second side of the mounting substrate, the adhesive surface having an adhesive layer operable to affix the mounting substrate to the component during strain measurement collection, the adhesive layer further operable to allow ready detachment of the mounting substrate from the component; and affixing a strain gage to the gage surface of the mounting substrate;

affixing the strain gage assembly to the component;

measuring a strain level of the component; and detaching the strain gage assembly from the component.

17. The method of claim 16, wherein the method of fabricating a strain gage assembly further comprises disposing a removable cover over the adhesive layer.

18. The method of claim 17, and further comprising removing the removable cover prior to affixing the strain gage assembly to the component.

19. The method of claim 16, wherein the step of providing a mounting substrate having an adhesive surface further comprises providing an adhesive surface having a gripping portion being devoid of the adhesive layer.

20. The method of claim 16, wherein the step of providing a mounting substrate further comprises providing an alignment element disposed on the mounting substrate operable to properly position the strain gage assembly on the component.

21. The method of claim 16, wherein the step of providing a mounting substrate further comprises providing a mounting substrate being formed from a substantially transparent material.

22. The method of claim 16, wherein the step of providing a mounting substrate further comprises providing a mounting substrate operable to reduce the strain level received by the strain gage.

23. The method of claim 16, and further comprising affixing the strain gage assembly to another component.

* * * * *

UNITED STATES PATENT AND TRADEMARK OFFICE
CERTIFICATE OF CORRECTION

PATENT NO. : 6,227,057 B1
DATED : May 8, 2001
INVENTOR(S) : Edwin G. Haas et al.

It is certified that error appears in the above-identified patent and that said Letters Patent is hereby corrected as shown below:

<u>Column 1,</u>
Line 3, insert -- STATEMENT OF GOVERNMENT RIGHTS
This invention was made with Government support under Cooperative Agreement N00014-95-2-003 awarded by the Office of Naval Research. The Government has certain rights in this invention. --.

Signed and Sealed this

Twelfth Day of March, 2002

Attest:

JAMES E. ROGAN
*Attesting Officer*  *Director of the United States Patent and Trademark Office*